(12) United States Patent
Wakefield et al.

(10) Patent No.: US 7,784,994 B2
(45) Date of Patent: Aug. 31, 2010

(54) AGGREGATE MIXING APPARATUS HAVING SPHERICAL BATCH MIXING VESSEL WITH JET PUMP TO HELP LOAD MATERIAL AND SINGLE PNEUMATIC SOURCE TO PRESSURIZE MIXING VESSEL AND DRIVE JET PUMP

(75) Inventors: Anthony Walby Wakefield, Stamford (GB); John Joseph Carroll, Stamford (GB)

(73) Assignee: Carroll Autoload Limited, Stamford, Lincolnshire (GB)

( * ) Notice: Subject to any disclaimer, the term of this patent is extended or adjusted under 35 U.S.C. 154(b) by 1103 days.

(21) Appl. No.: 10/573,617

(22) PCT Filed: Oct. 1, 2004

(86) PCT No.: PCT/GB2004/004176

§ 371 (c)(1),
(2), (4) Date: Mar. 28, 2006

(87) PCT Pub. No.: WO2005/032786

PCT Pub. Date: Apr. 14, 2005

(65) Prior Publication Data

US 2006/0250889 A1 Nov. 9, 2006

(30) Foreign Application Priority Data

Oct. 3, 2003 (GB) ................................. 0323120.6

(51) Int. Cl.
*B28C 5/12* (2006.01)
*B28C 5/46* (2006.01)
*B28C 7/16* (2006.01)

(52) U.S. Cl. ............................. 366/13; 366/10; 366/33; 366/41; 366/64; 366/153.1; 366/163.2; 366/191

(58) Field of Classification Search .................. 366/10, 366/33, 37, 51, 64, 114, 41, 153.1, 163.1, 366/163.2, 191, 139, 347, 13
See application file for complete search history.

(56) References Cited

U.S. PATENT DOCUMENTS 3,007,779 A 11/1961 Vlachos
3,860,175 A * 1/1975 Westerlund et al. ......... 239/165

(Continued)

FOREIGN PATENT DOCUMENTS

DE 3520877 A 12/1986

(Continued)

*Primary Examiner*—Charles E Cooley
(74) *Attorney, Agent, or Firm*—Richard M. Goldberg

(57) ABSTRACT

Mixing apparatus includes a batch mixing vessel with an inlet to receive constituent material, an agitation assembly for mixing the constituents and an outlet to convey batches of the mixed is provided. The apparatus includes a pressurizing device for pressurizing the vessel to assist in evacuation of the mix, and a conduit through which the mix is conveyed. A single pneumatic source is used both to pressurize the mixing vessel and to drive a jet pump including the batch loader. During the mixing cycle, the compressor used to discharge the finished mix is generally idle. This compressor can be used during these periods to drive a jet pump to load the mixing vessel. Therefore, manual loading is avoided and can be achieved such that the mixing cycle time is not interrupted.

10 Claims, 14 Drawing Sheets

U.S. PATENT DOCUMENTS

| | | | |
|---|---|---|---|
| 4,106,111 A * | 8/1978 | Rose ............................. 366/3 |
| 4,436,431 A * | 3/1984 | Strong et al. .................. 366/17 |
| 4,467,080 A * | 8/1984 | Brun et al. .................... 526/62 |
| 5,419,654 A * | 5/1995 | Kleiger ....................... 404/101 |
| 5,904,332 A * | 5/1999 | Lindbeck .................... 248/560 |
| 5,908,240 A | 6/1999 | Hood |
| 6,354,726 B2 | 3/2002 | Foerster |
| 6,485,171 B1 * | 11/2002 | Wang et al. ............... 366/153.1 |
| 6,715,195 B2 * | 4/2004 | Erickson ..................... 29/434 |
| 2001/0024400 A1 * | 9/2001 | Van Der Wel ............... 366/143 |
| 2003/0010792 A1 | 1/2003 | Forshey et al. |
| 2006/0152998 A1 * | 7/2006 | Burr et al. ................... 366/116 |
| 2006/0250889 A1 * | 11/2006 | Wakefield et al. ........... 366/142 |

FOREIGN PATENT DOCUMENTS

| | | |
|---|---|---|
| DE | 3829774 A1 | 3/1989 |
| FR | 2598938 A1 * | 11/1987 |

* cited by examiner

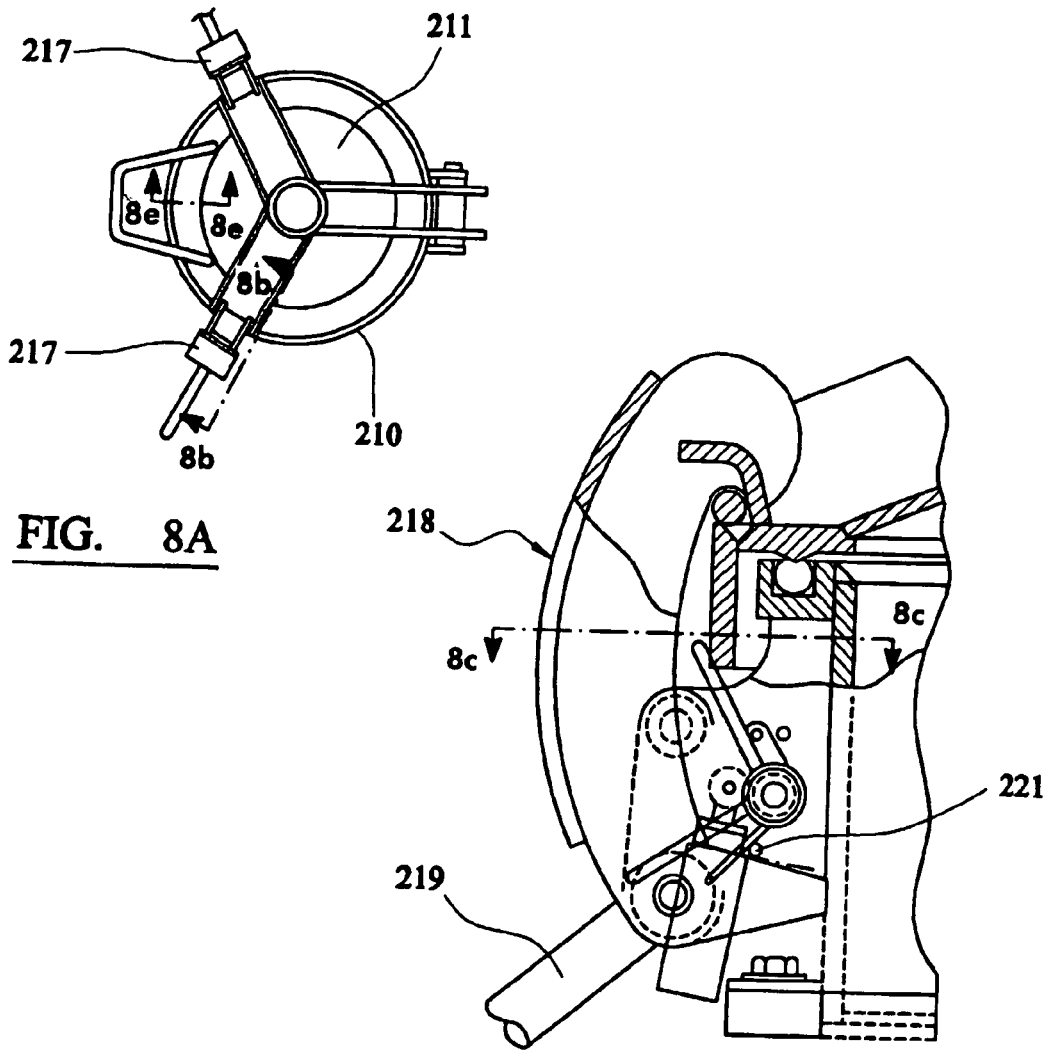
FIG. 8A
FIG. 8B
SECTION 8b-8b
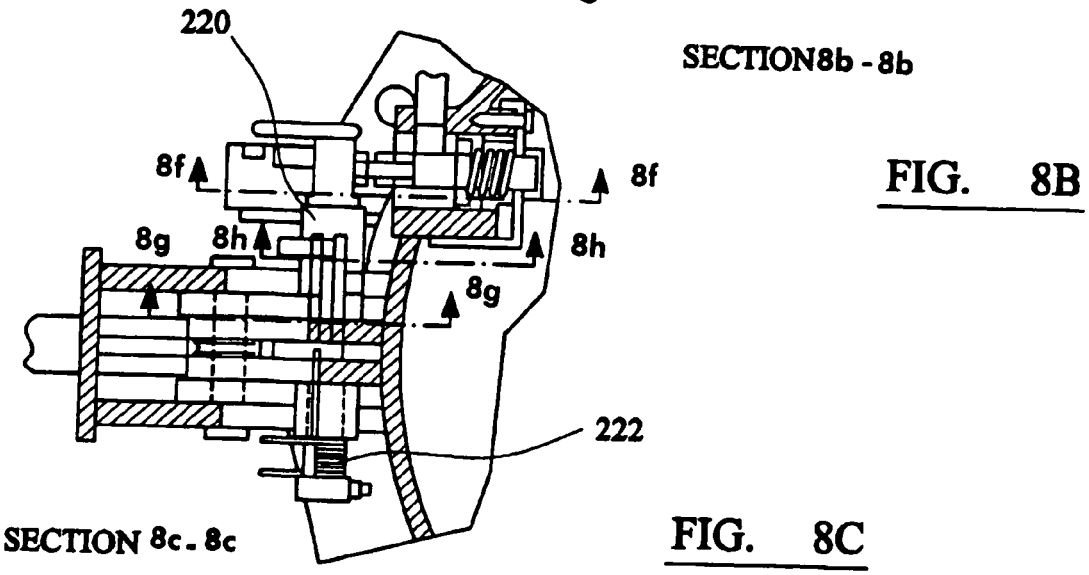
SECTION 8c-8c
FIG. 8C

'UNLOCKED' POSITION

SECTION 8e- 8e

SECTION 8f - 8f

SECTION 8g - 8g

SECTION 8h - 8h

AGGREGATE MIXING APPARATUS HAVING SPHERICAL BATCH MIXING VESSEL WITH JET PUMP TO HELP LOAD MATERIAL AND SINGLE PNEUMATIC SOURCE TO PRESSURIZE MIXING VESSEL AND DRIVE JET PUMP

BACKGROUND OF THE INVENTION

The present invention relates to mixing apparatus, for mixing materials, such as aggregates used in the construction industry, and in particular to apparatus which not only mixes the materials, but then conveys the mixed material to the required point of discharge. Such apparatus is commonly known as mixer-placer apparatus. The invention also relates to a mixing vessel and to a suction conduit assembly for such apparatus.

Concrete floors, for example, may be laid and screed with mixer-placer apparatus. Although traditionally, this technology is used in the construction industry, the technology can be applied to other industries where mixing and displacement of materials is required.

Existing mixer-place machines comprise a diesel engine which drives an air compressor. The diesel-engined compressor is typically mounted upon a wheeled chassis, or road trailer, which also supports a cylindrical batch holding vessel. The holding vessel serves as a mixing vessel and thus includes a rotatable mixing paddle arrangement. The mixing paddle arrangement is powered either by a hydraulic pump and motor or a belt drive or gear box. The cylinder is mounted with its axis horizontal and the mixer paddle drive shaft is on the axis of the cylinder.

The holding/mixing vessel is provided with a large charging opening in the upper part of the cylindrical side wall, the opening being closable by a lid and seal arrangement, which provides an air-tight seal to the vessel on closure of lid. This allows the contents of the vessel to be pressurised.

A delivery hose is connected to an outlet provided in the lower side wall of one end of the mixing vessel, to deliver the mixed product to the required location once the mixing stage is completed. A pneumatic supply line from the compressor is connected to the mixing vessel to effect discharge of the mixture, once mixing of the constituents is completed. Therefore, the principal function of the compressor is to pressurise the mixing vessel for discharge.

In use, when the mixing apparatus is to be used for mixing a floor screed material, the mixing vessel must first be charged with the sand, cement and water, in the required proportions. The lid covering the charging opening is removed, and a measured quantity of sand is shovelled into the mixer vessel from an adjacent sand heap. A bag of cement is split and also emptied in, together with the required amount of water and any additives required. During this process, the paddles are rotated, and once loaded, the lid fastened down securely, whilst the mixing process is completed.

Once mixing is complete, compressed air is admitted to the mixing vessel via the air inlet. The paddles in the mixing vessel urge the material towards the discharge outlet. As the mixture covers the opening, the mixture discharges and is conveyed by the pneumatic pressure from the compressed air through the delivery hose. A hose tripod device may be employed to kill the energy in the concrete and allows it to fall in a heap beneath it whence it is spread and levelled.

It will be appreciated that the time spent filling the mixing vessel occupies a significant part of the cycle, and that this is a labour-intensive stage.

In addition, with current mixer-place machines, great care needs to be taken to clean the lid for the charging aperture, and its seal to ensure that the seal is effective. This step is time consuming, and adds to the overall cycle time for a batch of mixture. In addition, it has been found that the handling at this step can serve to accelerate the deterioration of the seal.

If the total cycle time could be reduced, and if the labourer's time could be better utilized, then the total operational efficiency of the process can be improved.

SUMMARY OF THE INVENTION

It is an object of the present invention to provide mixing apparatus which attempts to address one or more of the disadvantages outlined above, and/or to provide improvements generally.

According to one aspect of the present invention there is provided mixing apparatus comprising a batch mixing vessel having an inlet to receive constituent material, an agitation assembly for mixing the constituents within the vessel and an outlet to convey batches of mixed material; the apparatus further comprising means for pressurising the mixing vessel to assist in evacuation of the mixed constituents from the outlet, and a batch loading means including a conduit through which the constituents are conveyed in use by fluid flow means; wherein a single pneumatic source is used both to pressurize the mixing vessel and to drive a jet pump comprising the batch loading means.

According to a second aspect of the invention, there is provided a mixing vessel for mixing apparatus comprising a sealable charging inlet for loading constituents to be mixed, and an outlet for discharging the mixed constituents, and means for pressurising the vessel; wherein the mixing vessel is generally spherical.

In yet a further aspect, there is provided mixing apparatus comprising a mixing vessel according to the second aspect of the present invention.

According to the present invention, it has been identified that during the mixing cycle, the compressor, used to discharge the finished mixture is generally idle, and required only at the time that the mixture is to be discharged. By utilising the compressor during conventionally idle periods, it has been found that the same compressor can also be used to drive a jet pump. Such a jet pump can be used to create sufficient vacuum to load the mixing vessel with the mixture constituents, without the need for manual loading, and within a sufficient time frame which would still allow the required mixing cycle time to be achieved.

The compressor is sized to produce the required discharge of screen mix to the required distance and elevation, but is only needed for a short part of the cycle for that purpose. By making use of the existing power source and compressor to provide vacuum suction on the mixing vessel input, a reduced loading time, and thus batch time, is achieved, and the loading itself is far less labour intensive.

It has been possible to design a jet pump to use an air volume and pressure to generate a vacuum in the mixing vessel with the cycle time achievable by traditional means (men shoveling) which is identical to that necessary for the required discharge flow rates and pressure.

The batch loading means comprises a conduit. A further aspect of the invention relates to the suction conduit. In view of the stiffness of conduit hose required to load the constituent materials, handling such hose can be difficult.

In a further aspect of the invention, an inlet suction conduit assembly is provided which includes adjustment means, such that the effective length of the conduit assembly can be varied in use, in a controlled manner. Preferably, the adjustment means comprises a section which is capable of telescopic movement, and this may be achieved by hydraulic actuation. It is preferred that the suction conduit assembly is rotatably mounted. In a further embodiment, the suction conduit is articulated. In such an arrangement, the articulated pipe is provided with a gimbal joint at the connection to the vessel and a knuckle joint with the horizontal axis part way along its length.

In a further preferred embodiment, the suction conduit assembly is provided with means operable to vibrate the intake, to facilitate entry of the constituent material, such as sand, into the suction inlet.

It has been identified that in order to create a sufficient vacuum to load the mixture constituents in time required, an optimum diameter of suction pipe or hose of the suction conduit assembly can be determined by test guided by calculation.

It is preferred that the suction conduit assembly is provided with some balancing mechanism, and is also provided with the ability to swing horizontally and vertically so that its suction inlet could map any three-dimensional volume within its reach. In an embodiment, sensor means are provided to enable the apparatus to consume a heap of mixture constituents systematically and without human intervention. In an embodiment, such a sensor may include a timer, for timing the length of time that the compressor has been operating, the quantity of material collected being proportional to the length of time of operation.

In an embodiment there is provided a hydraulically operated telescopic suction pipe for the suction conduit assembly. The power assistance is provided to the telescoping action.

In an embodiment, a short gimbal support is provided, allowing swinging of the pipe within a solid angle of +/−30°. The hose is provided with open convolutions which are non-clogging. The pipe is partly supported by a gas spring, the degree of support depending upon the extension and amount of sand within it. The gimbal arrangement allows hydraulic power of both swinging and raising and lowering, using circuit design and components identical with those which are used for its extension and retraction.

The end of the inlet pipe may be provided with a whirling ball vibrator to motivate the sand, and an alternative would be to mount the vibrator elastically, with probes to motivate the sand.

In one aspect of the present invention it is preferred that the mixing vessel of the mixing apparatus is generally spherical. It has been found that by replacing the conventional cylindrical shape of mixing vessel with a generally spherical vessel has a number of technical advantages.

The spherical form has been found to eliminate bending stresses in the shell. This enables a thinner shell material to be used, which requires only a single fabrication weld. This can be compared with three or four weld required in the conventional cylindrical form. This results in a cost saving not only on materials, but also reduced costs in the welding stages, and in the requisite subsequent testing of such welds.

It has also been found that the spherical cavity allows more complete filling (the spherical shape provides a better shaped air space above the mixture to reduce interference with the incoming constituents), more complete discharge (the shape also provides a positive low-point) and easier cleaning. The generally spherical shape also provides a more space-efficient structural form, such that the apparatus occupies less space.

In an embodiment, the mixing vessel is provided with a protective liner. The protective liner comprises a plurality of segments. The use of "orange-peel" segments to provide a protective liner for the mixing vessel avoids the use of castings, which would be heavier, more costly and more liable to fracture. The double curvature facilitates manufacture of the lining segments by simple rolling. It has been identified that in use, most of the wear takes place towards the lower end of the "segments". In view of their shape, the liner segments are reversible, and can simply be rotated through 180° and then re-used.

In an embodiment, the mixing vessel is provided with a level sensor. The level sensor preferably operates on the principle of the oscillating-vane level sensor. When the vessel is under vacuum, a pressure difference exists which can be used to energise the incoming water to form a jet. This jet may be directed against any parts which would benefit from washing, such as a screen through which the incoming solids have to pass (to filter out stones and fragments of cement bags etc.), the level sensor, and the suction inlet control valve. The washing of the seal of the lid is advantageous to reduce its deterioration, in view of the abrasive materials being mixed.

In an embodiment, there is provided an hydraulic drive for the mixing paddles. This is considered advantageous over other drive means, because it frees the mixture vessel from constraints of location relative to the engine for the compressor.

In an embodiment, clamping means are provided to prevent accidental lifting of the lid/cover of the mixing vessel in any condition of internal pressure of vacuum. The clamp is in an over-centre arrangement, such that high pressure in the vessel prevents operation because an unrealisable operator force is required. At a low vessel pressure, operation of the clamps may be prevented by the additional release mechanism. Accidental operation of release mechanism is also prevented, and venting of any escaping jet is controlled. The edge of the lid is formed with a downward deflector provided by the profile of the edge of the lid, in such a way as to prevent injury to the operator and at the same time to provide necessary structural integrity. Forcing the release lever would vent the pressure safely and stop the engine.

Other modifications which are envisaged within the scope of the present invention is the use of one or more additional smaller jet pumps which can be used to load additives such as fibres to the mixing vessel. These would be driven from the same air supply as the main jet pump but operated only as long as necessary. In this way, the provision of an additional or secondary self-loading facility is achieved at almost no additional cost. The use of additional small jet pumps prevents interaction of loading pipes or hoses and possible unsolicited variation of mix.

BRIEF DESCRIPTION OF THE DRAWINGS

Embodiments of the various aspects of the present invention will now be described, by way of example only, with reference to the following illustrative drawings in which:

FIG. 6a is a partial cross section of the lid/seal arrangement for the mixing vessel of FIG. 5 taken along line 6a-6a of FIG. 6b, and FIG. 6b is a plan view of FIG. 6a viewed along arrow 6b of FIG. 6a;

FIG. 8a is a plan view of the mixing vessel lid and FIGS. 8b, 8c, 8d, 8e, 8f, 8g and 8h are further cross-sectional views of the lid locking assembly;

DETAILED DESCRIPTION

Figure 1:
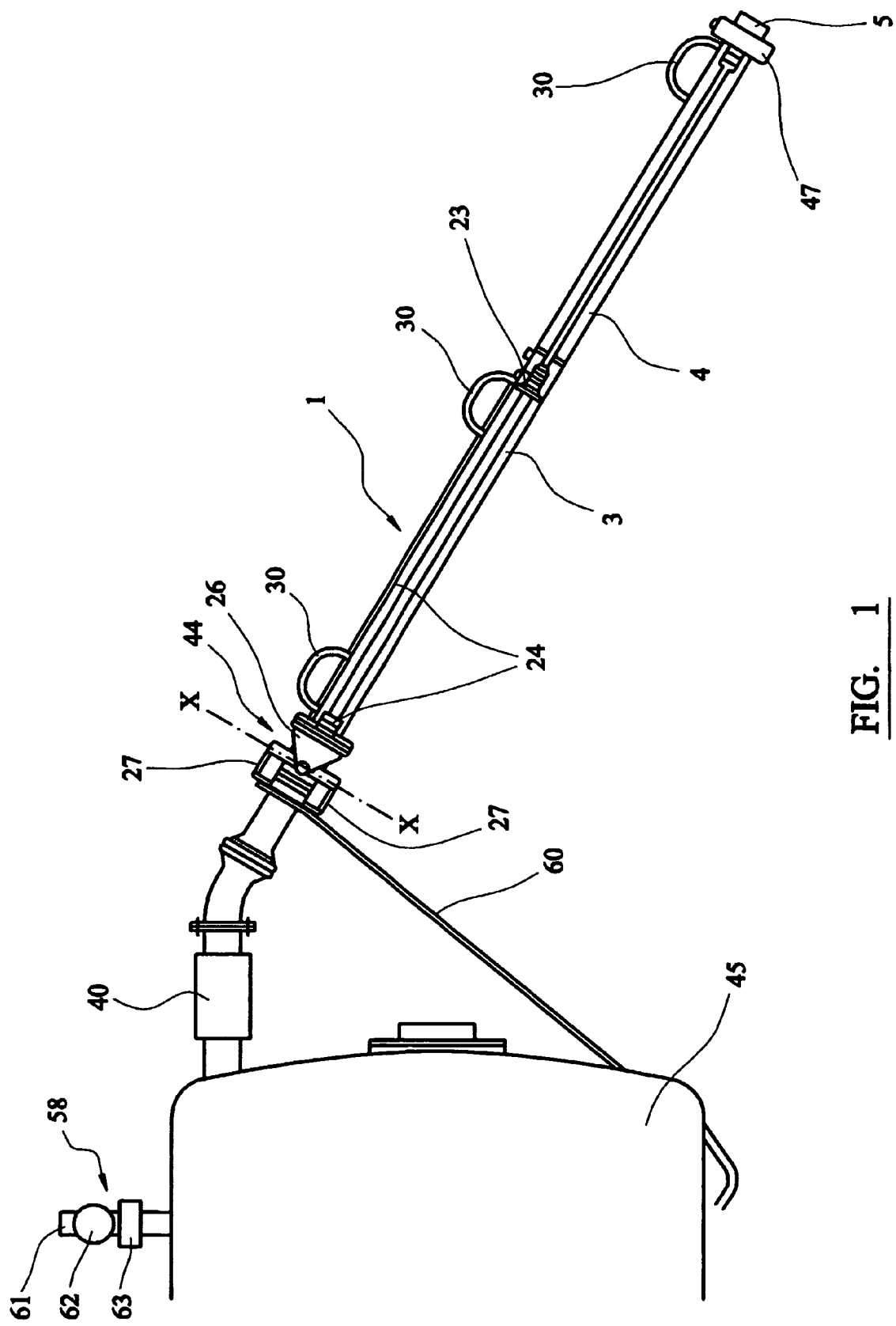
FIG. 1 is a side elevation of a suction conduit assembly in accordance to one aspect of the present invention, attached to a holding vessel.

Referring to FIG. 1, a suction conduit assembly 1 through which material is conveyed comprises a first pipe section 3, a second pipe section 4 and an intake 5. The bore of the first pipe section 3 is dimensioned such that the second pipe 4 is capable of telescopic movement within said first pipe section 3, so that the effective length of the suction conduit can be varied.

Figure 3:
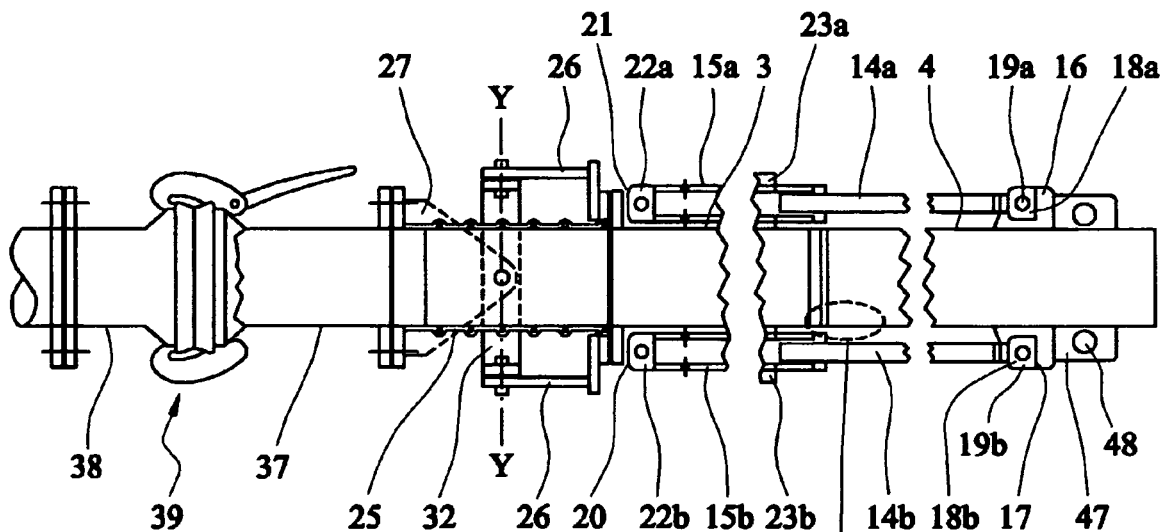
FIG. 3 is an enlarged view of FIG. 2.
Figure 3A:
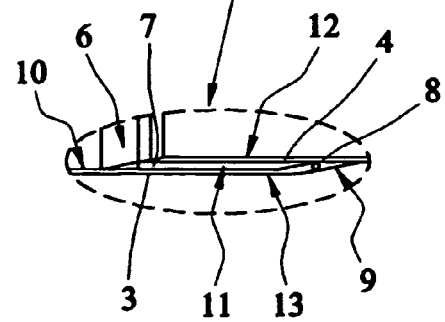
FIG. 3A is an enlarged view of the area circled in FIG. 3.

Referring to FIGS. 3 and 3A, attached to the inner surface 12 of the distal end 7 of second pipe section 4 is a sealing skirt 6. The sealing skirt 6 is of substantially frusto-conical shape and forms a substantial seal with the inner surface 10 of the first pipe section 3.

Similarly, a sealing skirt 9 is provided on the outer surface 13 of the distal end 8 of the first pipe section 3. The sealing skirt 9 is of substantially frusto-conical shape and forms a substantial seal with the outer surface 11 of the second pipe section 4. The distal end 7 and the distal end 8 are flared and tapered respectively to ensure sealing contact of the skirts with the respective surfaces.

Figure 2:
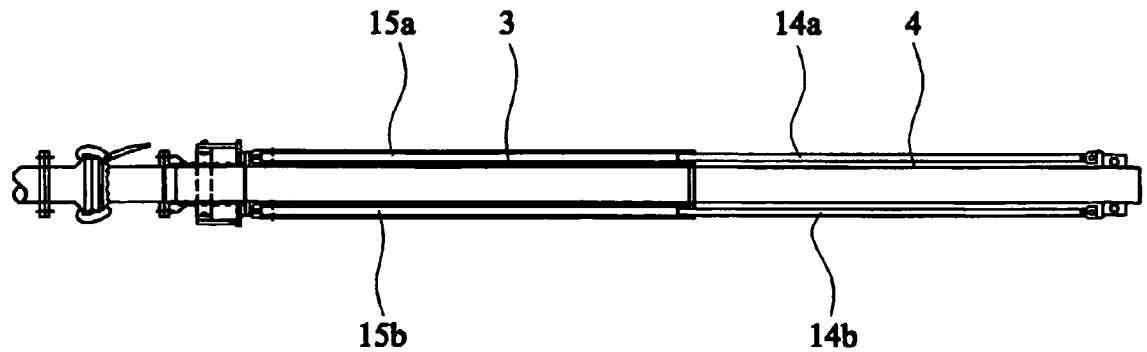
FIG. 2 is a plan view of the embodiment shown in FIG. 1 which is in part in cross section.

The suction conduit assembly 1 further comprises pistons 14a and 14b and associated hydraulic cylinders 15a and 15b. The pistons 14a and 14b are secured to the second pipe section 4 in the following manner. Two pairs of plates 16 and 17 (one plate of each pair is shown in FIGS. 2 and 3) which are rigidly attached to the second pipe, are spaced so as to accommodate bored portions 18a and 18b. Bores 19a and 19b are aligned with holes in the plate pairs 16 and 17 so that securing pins (not shown) can pass there through. The bored portions 18a and 18b are attached to the respective pistons by ball joints (not shown). The pistons 14a and 14b are actuated by respective hydraulic lines 24, the hydraulic lines being in communication with opposite ends of each cylinder 15a and 15b. The pistons 14a and 14b may conveniently be powered from the hydraulic system associated with the holding vessel 45, if one is so provided.

Each of the hydraulic cylinders 15a and 15b is attached at two locations on the first pipe section 3. The hydraulic cylinders are secured in the first instance by securing pins (not shown) through plate pairs 20 and 21 (one plate of each pair is shown in FIGS. 2 and 3) and bored portions 22a and 22b are attached to the respective cylinders by ball joints (not shown).

A gimbal 44 comprising two double-limbed components 26 and 27 and frame 32 is provided between the first pipe section 3 and pipe 37, the double-limbed components 26 and 27 partially surrounding a length of flexible hosing 25. The double-limbed component 26 is attached to frame 32 for rotation of the pipe sections 3 and 4 about an axis Y-Y. The double-limbed component 27 is attached to the frame 32 in a plane perpendicular to the axis Y-Y for rotation of the pipe sections 3 and 4 about an axis X-X. The pipe 27 is clamped to pipe 38 by a Bauer clamp 39, and the pipe 38 leads up to a shut-off valve 40 and then into a holding vessel 45. The holding vessel 45 may house agitators for mixing materials therein.

A vibrator 47 is provided on the second pipe section 4 and comprises a circular track 48 around which a ball bearing is circulated by means of a compressed air supply (not shown). A support rod 60 is provided between the underside of the suction conduit assembly 1 and the holding vessel 45.

In use, the assembly operate as follows. Evacuation means 58 comprises an air outlet 61, an evacuation pump 62 and an isolation valve 63. In an embodiment, the evacuation pump 62 is a jet pump, as it is not practicable to protect the pump with certainty from solid particles. The jet pump is preferably of the type sold under the trade mark GENFLO™. If the holding vessel 45 is part of the apparatus for pneumatically conveyed batches of mixed material, then the jet pump may conveniently be driven from the air compressor used therefor.

After the shut-off valve has been opened and the evacuation pump has been started, an operator then directs the intake 5 of the second pipe section 4 at a heap of material (not shown) to be loaded into the holding vessel 45. The operator then, via suitable controls, extends the second pipe section 4 to penetrate the heap of material, and in so doing, material is taken into the conduit assembly 1 and then into the holding vessel 45.

Once the second pipe section 4 has been fully extended, said second pipe 4 section is then retracted out of the heap after which the second pipe 4 is again extended into the heap to load further material into the holding vessel 45. This repeated extension and retraction of the second pipe section 4 thus produces a reciprocating action, the rate of which is determined by the characteristics of the material to be loaded. The vibrator 47 produces an orbital motion of the intake 5, thus ensuring that the intake 5 does not clog, and that any clumps of material around the intake 5 in the heap are loosened.

If the holding apparatus 45 is part of apparatus to convey batches of mixed material pneumatically, then once the required amount of material has been loaded into the vessel then valves 40 and 63 can be turned off and an outlet valve (not shown) opened. The holding vessel can then be pressurised to force the mixed material out of the vessel.

Handles 30 mounted on the pipe sections 3 and 4 ensure that once the suction conduit assembly is detached by the clamp 39, it can be carried with a reduced risk of causing damage.

In a modification of the assembly 1, the gimbal 44 may be adapted to be used with or replaced with appropriate service means so as to control the rotational movement of the suction conduit assembly.

In another modification of this aspect of the invention, the second pipe section 4 may be provided with an attachment to facilitate the loading process of a given material. The attachment may, for example, comprise an actuated scoop to capture material in the heap to be sucked away through the intake 5.

Figure 4:
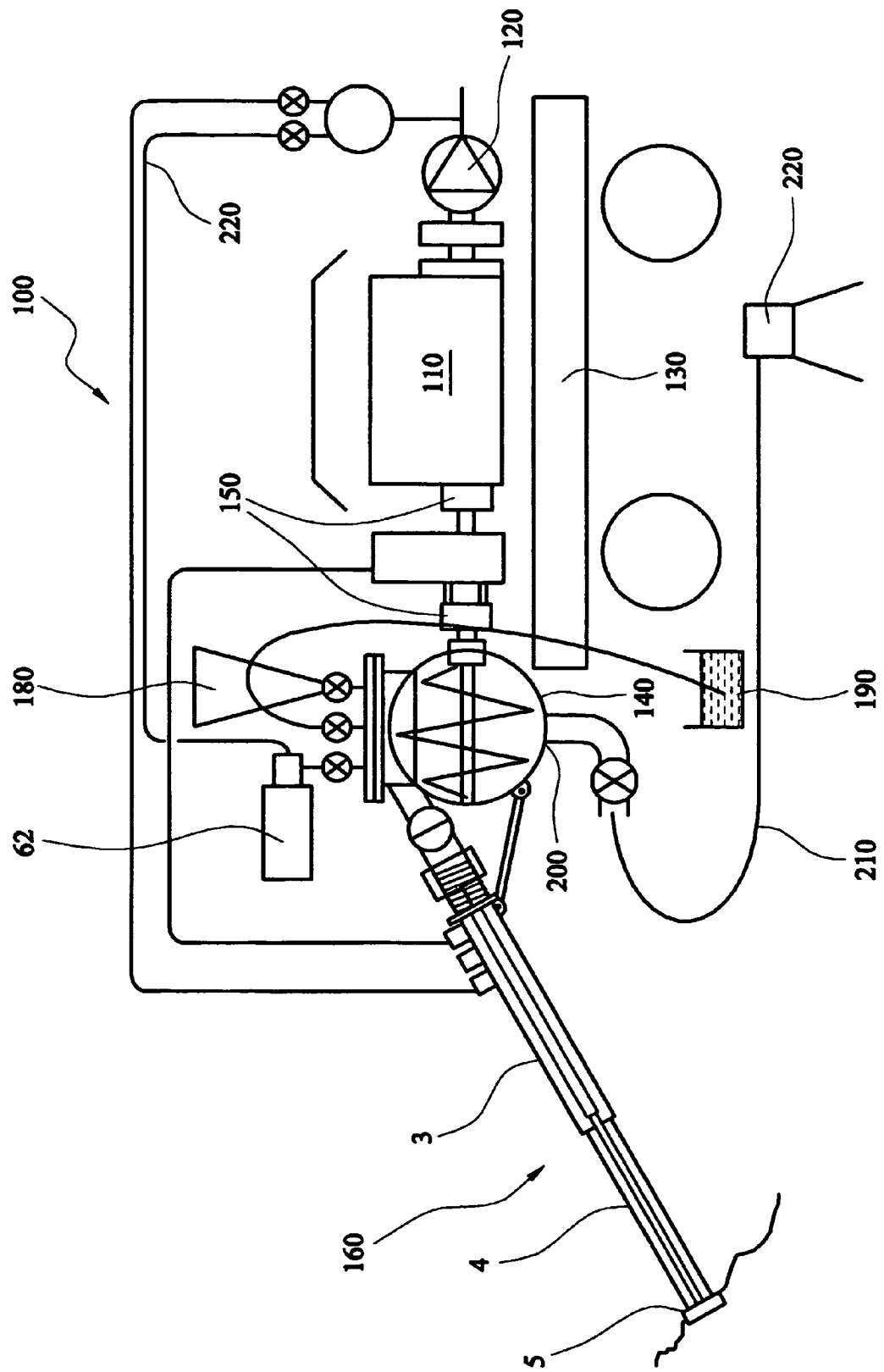
FIG. 4 is a schematic diagram of a mixer-placer machine according to a second aspect of the invention.

FIG. 4 is a schematic diagram of a mixer-placer machine according to a second aspect of the invention. As can be seen, the apparatus generally designated 100 comprises a diesel engine 110 which drives an air compressor 120. The diesel engine 110/compressor 120 is mounted upon a wheeled road trailer 130, which also supports a generally spherical batch holding, or mixing, vessel 140. The mixing vessel 140 includes a rotatable paddle assembly which is mounted on a drive shaft powered by an hydraulic pump and motor assembly 150 which is driven by the diesel engine 110.

The top of the mixing vessel 140 is provided with a closeable charging inlet into which the materials to be mixed are loaded. The charging inlet is sealed with a lid and seal arrangement, which provides an air tight seal to the mixing vessel 140 on closure of the lid, to enable the vessel to be pressurised.

In the illustrated embodiment, the loading of at least some of the constituent materials (in this case sand, water and cement to make concrete), is achieved automatically without manual loading using a suction conduit assembly 160 substantially as described above in relation to FIGS. 1 to 3A (equivalent parts are designated by the same reference numerals). Additional loading means include a cement hopper 180 and a water supply 190 which are also in communication with the mixing vessel 140 via the charging inlet.

A discharge outlet 200 is provided in the base of the mixing chamber 140, to which is connected a delivery hose 210. The delivery hose 210 transports the discharged mixture and conveys it by pneumatic pressure, supplied via supply line 220 from the compressor 120, when the discharge valve is opened.

In use, the engine 110 is started, and the controls are set to operate the jet pump 62. The engine also drives the mixing paddles in the mixing vessel 140, which rotate to agitate and mix the added constituents.

The mixing vessel 140 is evacuated, and the sand is added to the mixing vessel via the suction conduit assembly 160. At the same time, the valve to the cement hopper 180 is opened to admit a pre-determined amount of cement to the mixing vessel, and similarly a volume of water from the water supply 190 is also emptied into the mixing vessel. The valves to the cement hopper 180 and water supply 190 are closed once the required amount has been discharged into the vessel 140.

Once the constituents are sufficiently mixed to the required consistency, the mixing vessel is pressurised using air from the compressor 120 along supply line 220. It can be seen that advantageously, the same air supply may be used to supply both the jet pump 62 and to pressurise the mixing vessel 140, as each requires the air supply at a different stage in the process. The valve in the discharge hose 210 is opened and the mixture is discharged via the discharge outlet 200 and is conveyed along discharge hose 210 to its required location. A conventional tripod arrangement 220 may be provided to kill the energy in the mixture (concrete) and allow it to fall in a heap to be spread.

Figure 5:
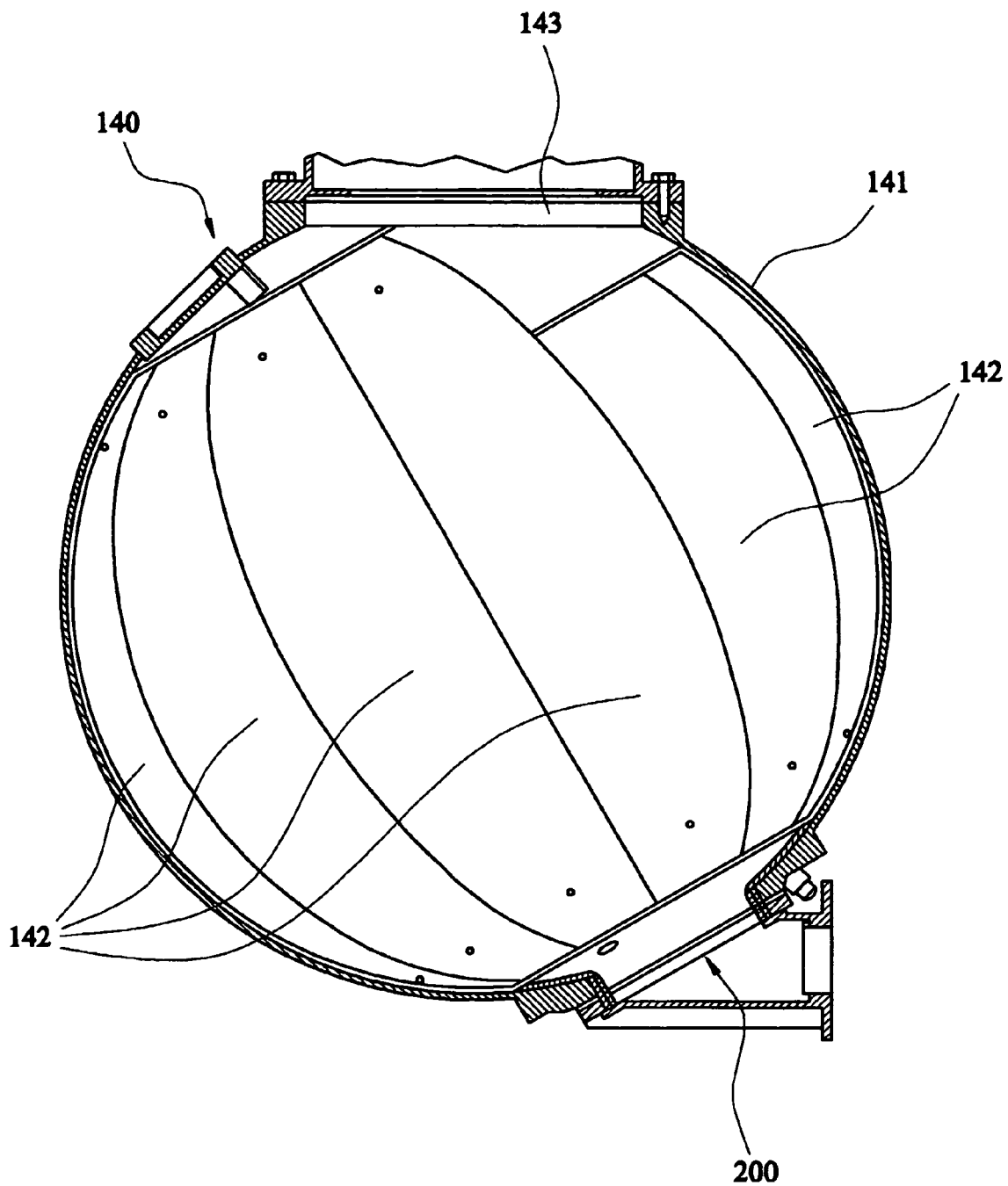
FIG. 5 is a detailed view of a mixing vessel according to a further aspect of the invention.

As can be seen in FIG. 5, the mixing vessel 140 is generally of spherical configuration. The pressure shell 141 forming the outer part of the mixing vessel 140 is formed from a pair of hemispheres produced by pressing or spinning. The shell is provided with 12 lining segments 142. These sufficiently duplicate the form of the pressure shell 141, which they protect from abrasive wear of the constituents to be mixed within the vessel. Eight of the lining segments 142 are reversible, top to bottom. The charging inlet 143 is provided at the top of the vessel 140, and the discharge outlet 200 is provided slightly offset from the bottom of the vessel 140.

Figures 6A, 6B:
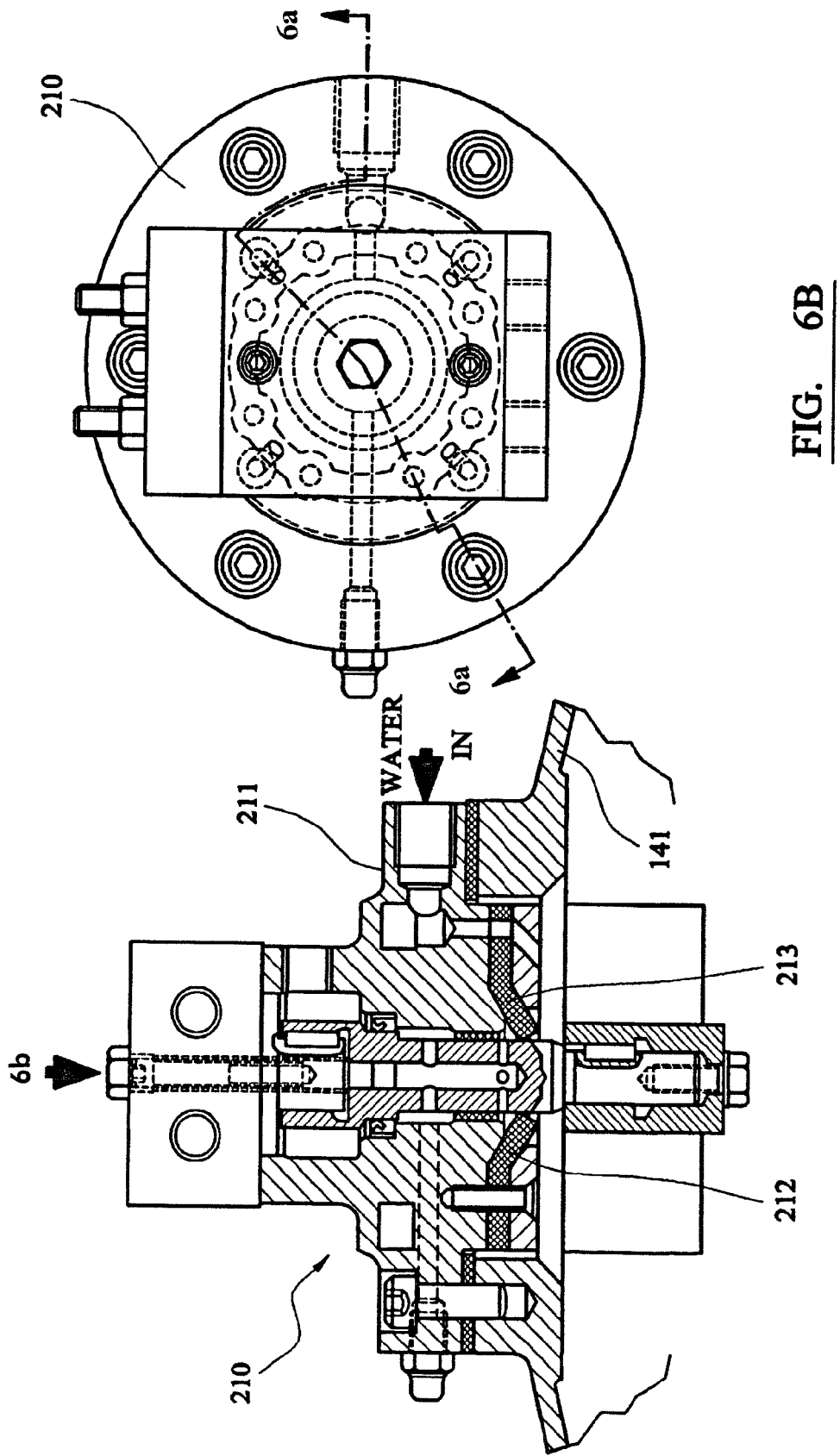

As can be seen in FIGS. 6a and 6b, the charging inlet of the mixing vessel 140 is provided with a lid 210 to seal the vessel. Water is admitted by a branch formed in the lid housing 211. It passes through a hole in a flat seal 212 and thence to a nozzle formed in the seal retaining place 213. A non-return valve (not shown) prevents reverse flow through the branch when the vessel 140 is pressurised. The seal plate 213 and the housing 211 are formed to dish the seal.

The shape of the seal plate 213 and housing 211 forms the seal shape, thus allowing a low cost flat seal to be used. The dished form of the seal 212 provides a simple means of giving a low-torque sealing action when under vacuum and a tight seal when under pressure.

Figures 7A, 7B:
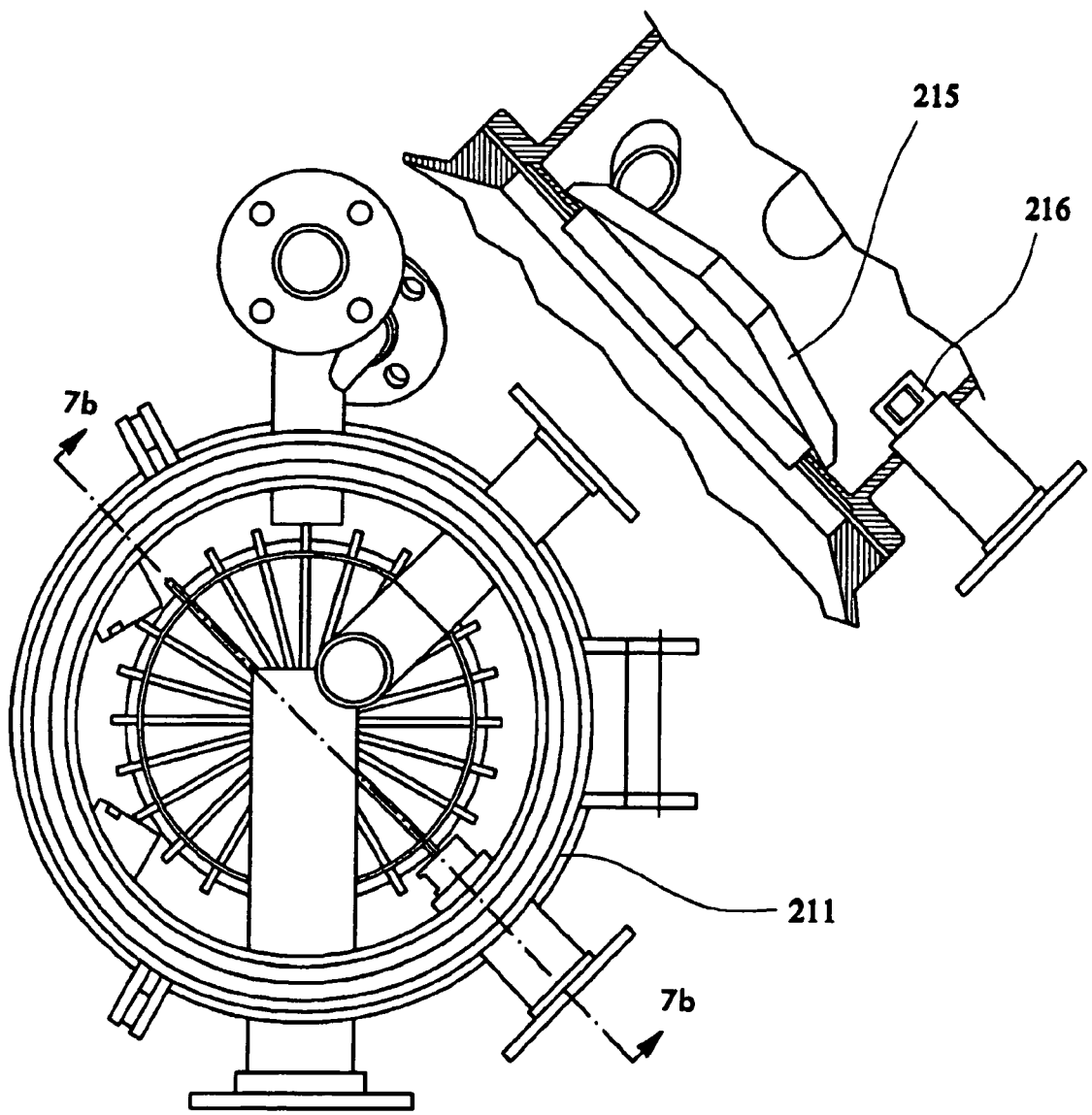
FIG. 7a is a plan view of the lid housing for the mixing vessel.
FIG. 7b is a sectional view on line 7b-7b of FIG. 7a showing the inlet screen.

As can be seen in FIGS. 7a and 7b, the water provided to the mixing vessel 140 can be used to form a washing jet. The energy to drive the washing jet is provided by the vacuum generated in the mixing vessel 140 by the jet pump 62.

The washing jet may be used to provide a directional water injection to clean an internal screen area. All constituent material enters the mixing vessel 140 via a circular screen 215, which is located beneath the lid 210. The screen 215 is crowned, with radial and circumferential vanes, and serves to trap material such as fragments of bag and stones which should not be present in the sand, or stones, but which have been sucked up from beneath the sand heap. A gully surrounds the screen. Water is injected into the screen area through a nozzle 216 which is adjustable in orientation, for example the nozzle may be rotatable to direct the water spray as required.

The conical screen form is largely self-cleaning, with stones which have been sucked up falling to the gully surrounding the screen. Cleaning is assisted by the water jets. The adjustability of the nozzle 216 allows it to be set effectively. Advantageously, the washing water forms part of the concrete mix.

Figure 8D:
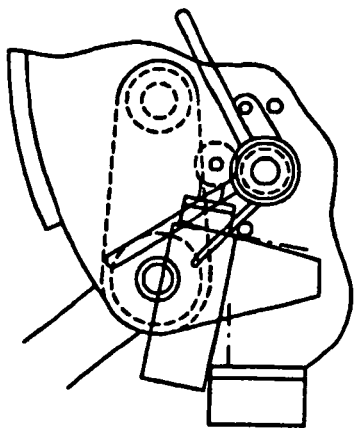
Figure 8E:
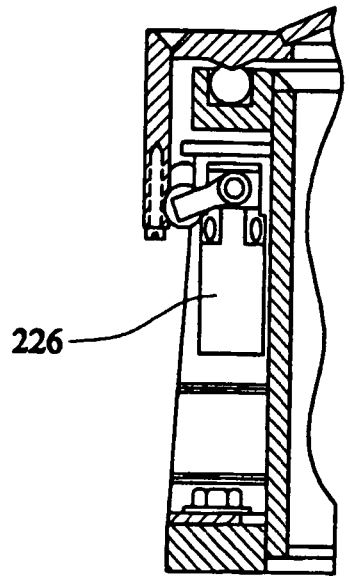
Figure 8F:
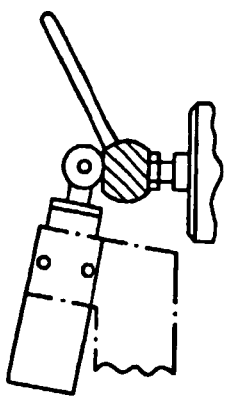
Figure 8G:
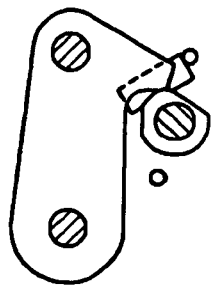
Figure 8H:

As can be seen in FIGS. 8a to 8h, there are two identical securing latching assemblies 217 for the lid assembly 210 for the mixing vessel 140. When the mixing vessel 140 is pressurised, opening is prevented by the internal pressure acting through over-centre links, lever 218 and handle extension 219, and a cam, part of shaft 220, arrangement working through a small lever, part of shaft 220 shown by Section 8f-8f (FIG. 8f).

Figure 9:
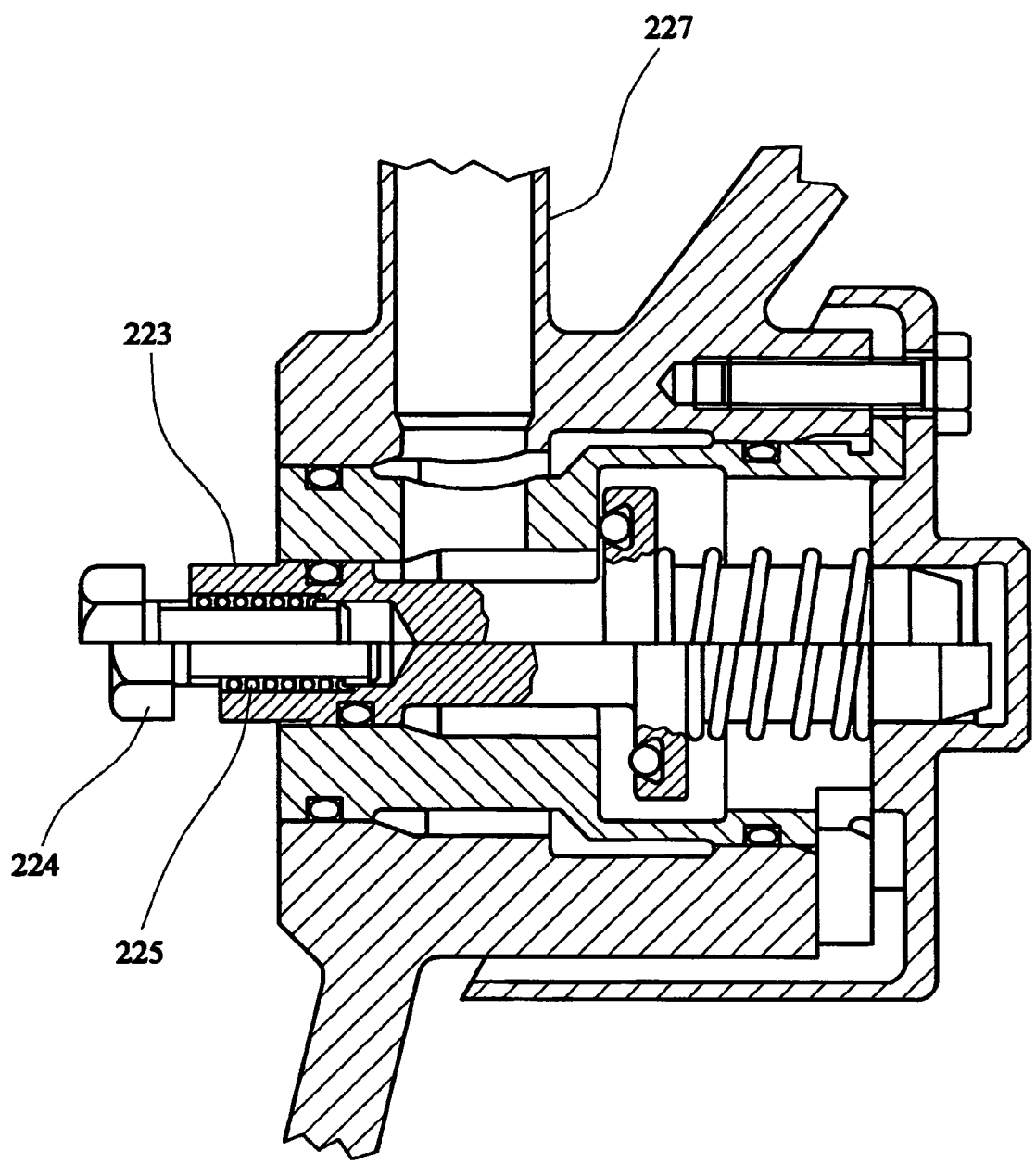
FIG. 9 is a cross section view of a pressure release valve assembly for part of the lid closure mechanism of FIGS. 8a to 8h.

The travel of this lever is controlled by the flat bar, part of shaft 220, shown on 8h-8h (FIG. 8h) and two roll pins 221. The shaft 220 is held in the closed position by a torsion spring 222. Additional resistance to rotation is introduced by valve 223 shown in FIG. 9. This is held closed by the pressure in the vessel 140 plus the spring load of item 220 required to prevent the valve 223 being opened by a vacuum while the vessel 140 is filling.

Adjustment of the valve 223 is by means of a screw 224 prevented from loosening by a self-locking helical insert 225. Valves must be left open before starting the engine 110 to prevent overload of the compressor 120. The engine 110 cannot be started until both latch levers 218 have secured the lid 210. Up to this point the limit switch 226 on Section 8f-8f de-energises the solenoid shut-down valve on the fuel pump. The limit switch 226 under the lid 210 shown on Section 8e-8e (FIG. 8e) also activates the solenoid shut-down valve.

To prevent accidental shut-down, the pressure in the mixing vessel 140 must be released by means of a gate valve (not shown) before it is possible to operate the small lever, part of shaft 220, in turn operating the limit switch 226 and venting any residual pressure through branch 227, part of the pressure vessel 140 and release valve 223. The main lever 218 cannot be rotated until the cam, part of shaft 220, on Section 8g-8g (FIG. 8g) is rotated by means of the small lever, part of shaft 220, shown on Section 8f-8f (FIG. 8f).

If at any time the lid 210 is raised, perhaps through failure of part of the mechanism described, the jet emerging from the gap between lid 210 and vessel 140 is deflected downwards by the profile of the edge of the lid. It is unlikely that failures of both latch mechanisms will fail together.

Figure 10B:
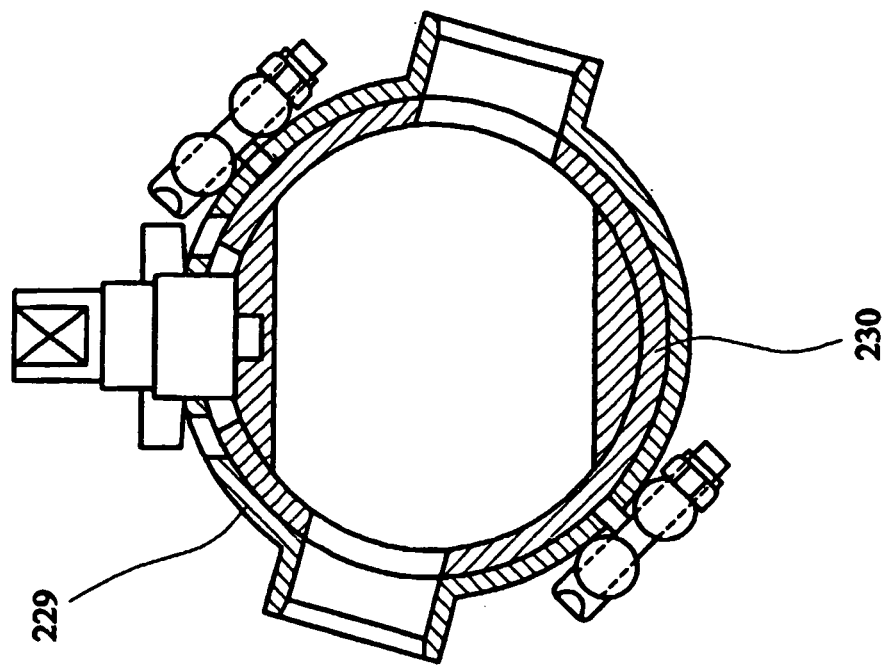
FIG. 10b is a sectional view of FIG. 10a along line 10b-10b.
Figure 10A:
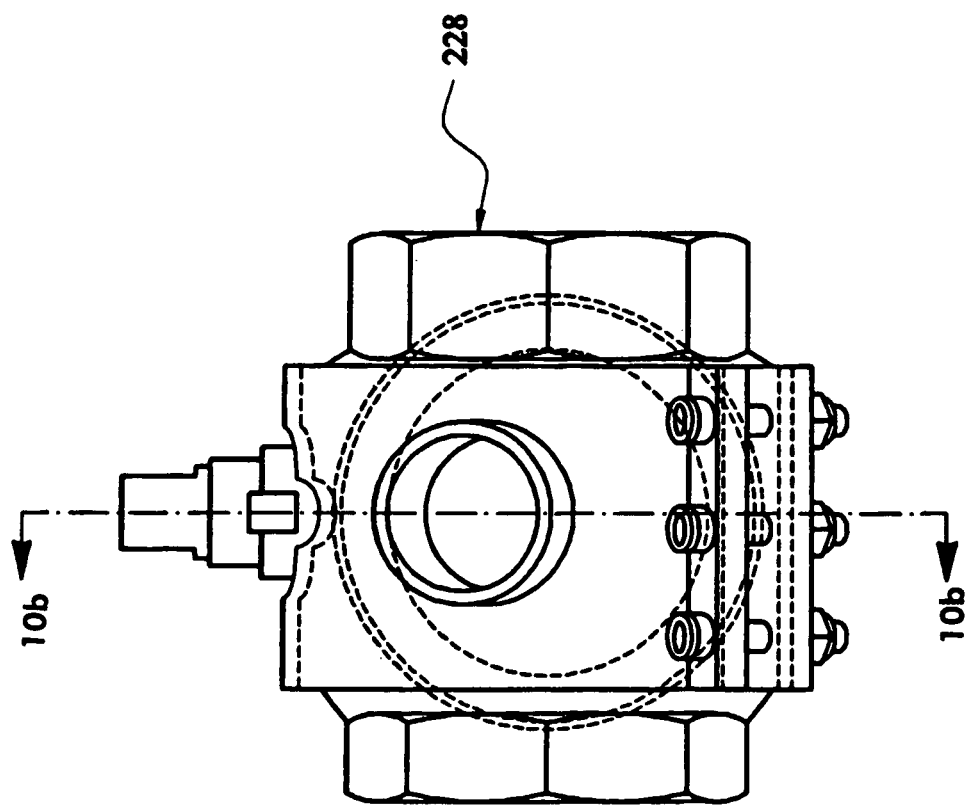
FIG. 10a depicts a modification to a standard ball valve for the suction pipe 160.

As can be seen in FIGS. 10a and 10b, a modification to standard ball valve for the suction pipe 160 is provided. A ball valve will admit solids into the cavity between the seals, if it is operated when not completely clean. A standard ball valve will then quickly jam, and is thus not usable in the mixer-placer environment. In the present invention, the body of a conventional ball valve 228 is drilled through on a diameter. A steel split cover 229 is formed with branches to correspond with these ports when clamped into position. A seal 230 is formed in-situ by a two-part sealing compound. Once every operating cycle, when the vessel 140 is under vacuum, water is flushed through the valve via the branches in the cover 229.

This modification makes a standard, low-cost ball valve suitable for vacuum solids transmission. The energy to drive the sluicing water is provided by the vacuum generated in the vessel 140 by the jet pump 62. Advantageously, the sluicing water forms part of the concrete mix. In an alternative embodiment (not shown) the ball valve is replaced with a pinch valve.

Figure 11:
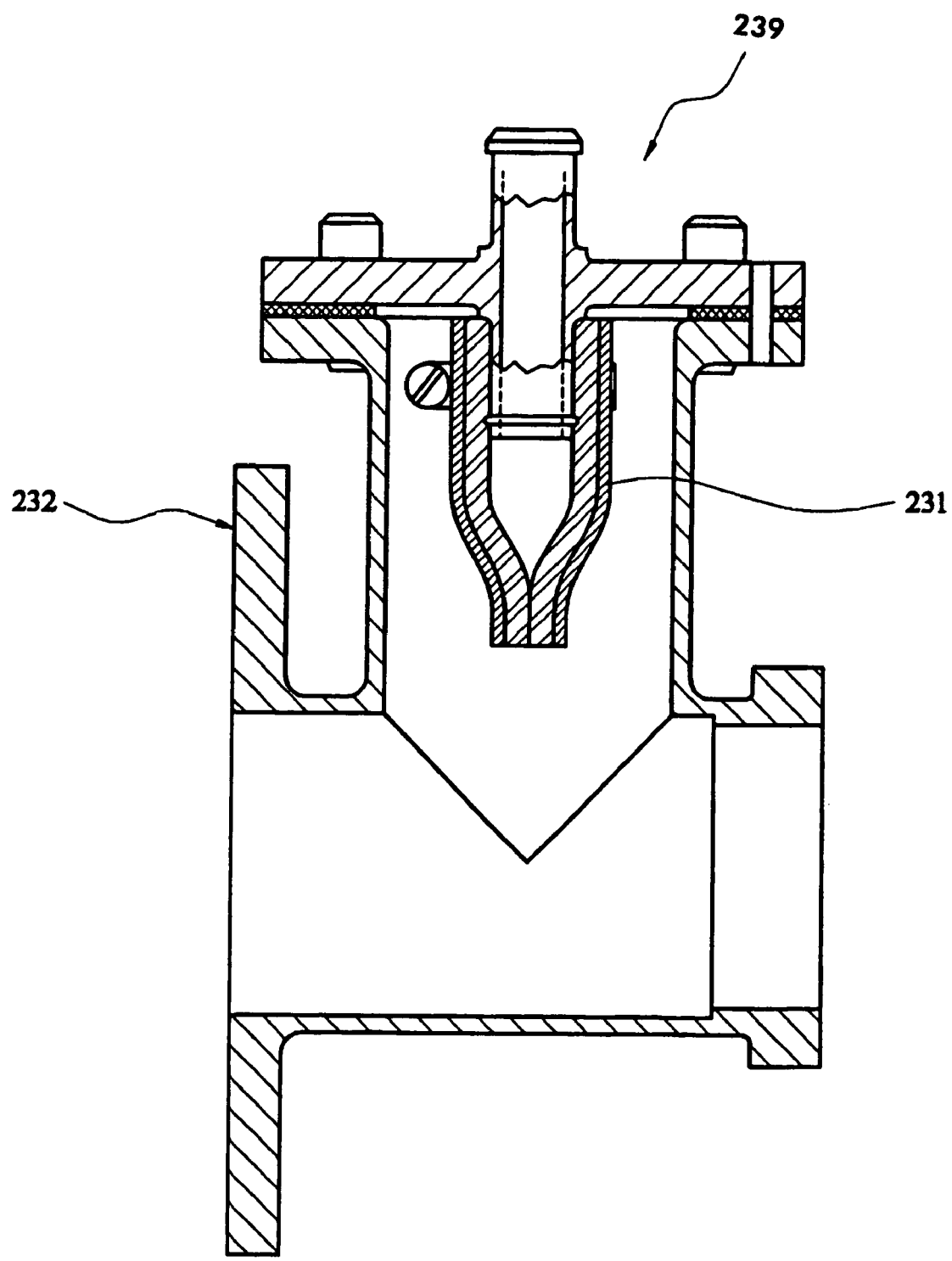
FIG. 11 illustrates the valve assembly provided in the discharge hose.

FIG. 11 illustrates the valve assembly provided in the discharge hose 210. It has been found advantageous to inject air into the flow discharged from the mixing vessel 140 in order to achieve discharge to the required distance and elevation from the available pressure. There is provided a duckbill chopper valve 239 (so called because it chops up what would otherwise be a solid column of concrete mix into alternating slugs of air and mix) through which air is admitted. The valve element 231 is formed from reinforced rubber. A branch is provided in the housing 232 for water cleaning if necessary.

The lined duckbill form needs no maintenance. The greater the pressure, the better the seal from a thick, soft natural rubber lining. The form is also strictly one-way and concrete cannot be forced into the air line.

Figure 12:
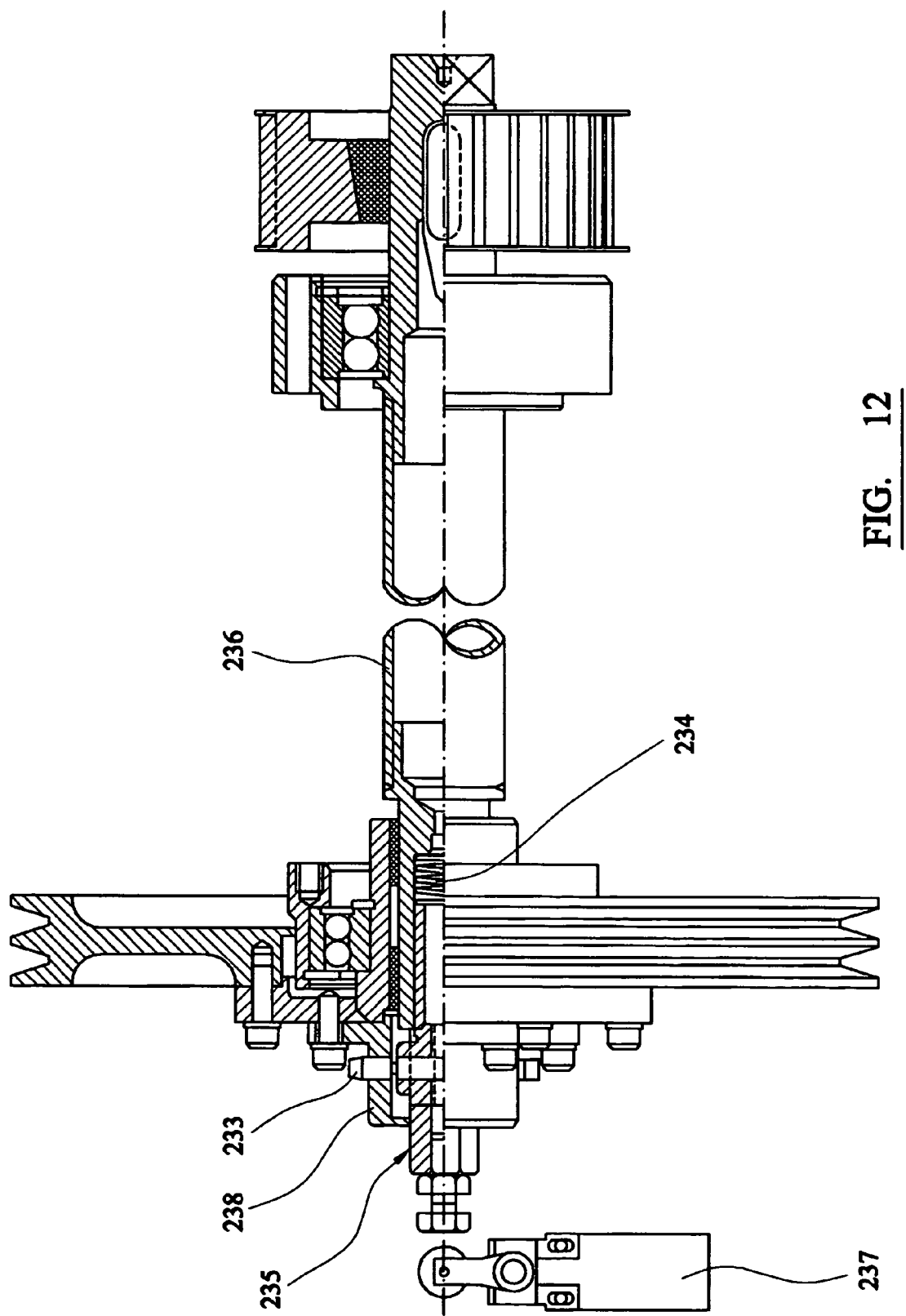
FIG. 12 is a diagrammatic view of the drive shaft assembly of the apparatus.

As can be seen in FIG. 12, there is provided a safety mechanism, in the event that one of the mixing paddles in the mixing chamber 140 should jam. In this event, a torque limiter prevents damage to the gearbox. The torque limiter operates by shearing a sacrificial shear pin 233. When the pin 233 shears, a spring 234 pushes the shear pin carrier 235, located in a fork extension on the drive shaft 236, away from the drive shaft 236 and operates a limit switch 237 which in turn shuts the engine 110 down via the fuel pump solenoid. The ends of the sheared pin would tend to fly out, but are retained by the screws attaching shear pin housing 238. The waist of the shear pin is located in an annular gap between shear pin carrier 235 and shear pin housing 238.

In this way, damage to the gear box and remainder of paddle drive train caused by jamming is prevented. The engine 110 is shut down immediately the shear pin fails, and the broken shear pins cannot escape until released. The annular gap prevents internal damage which might be caused by the ends of the shear pin fragments.

Figure 13:
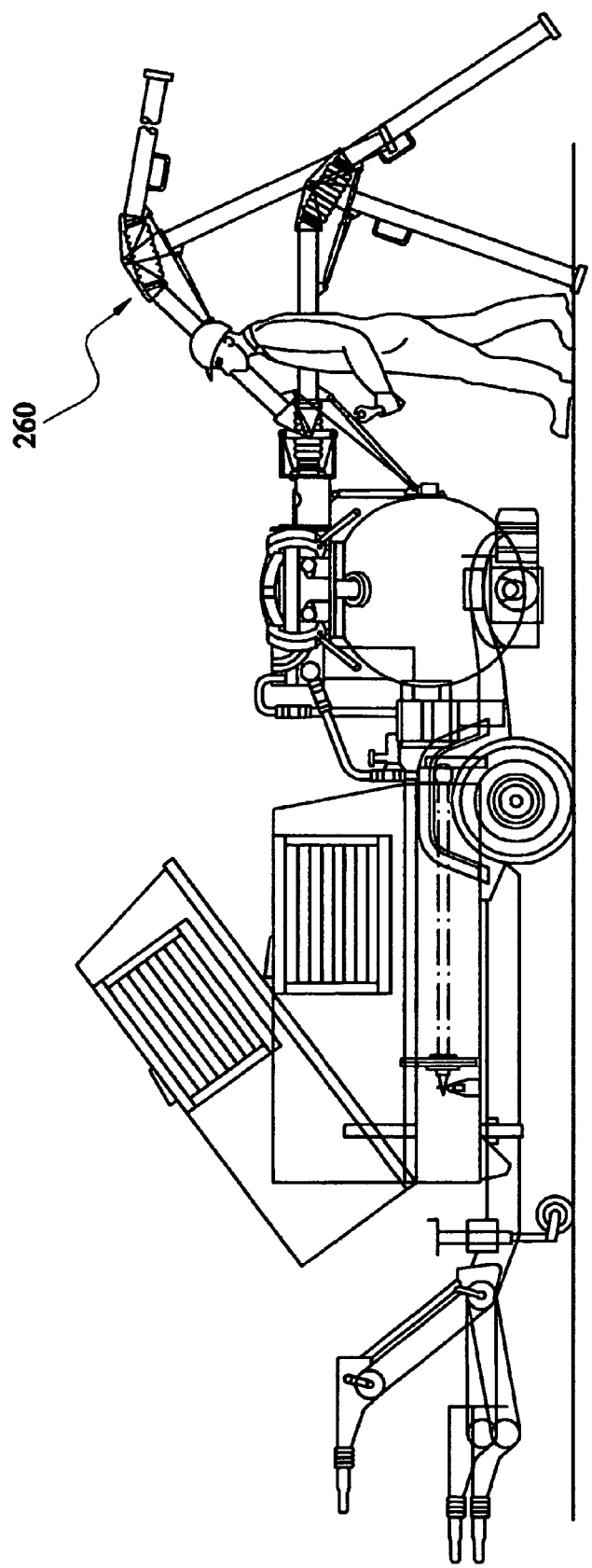
FIG. 13 is a side elevation of a suction conduit assembly according to a further embodiment of the invention.
Figure 14:
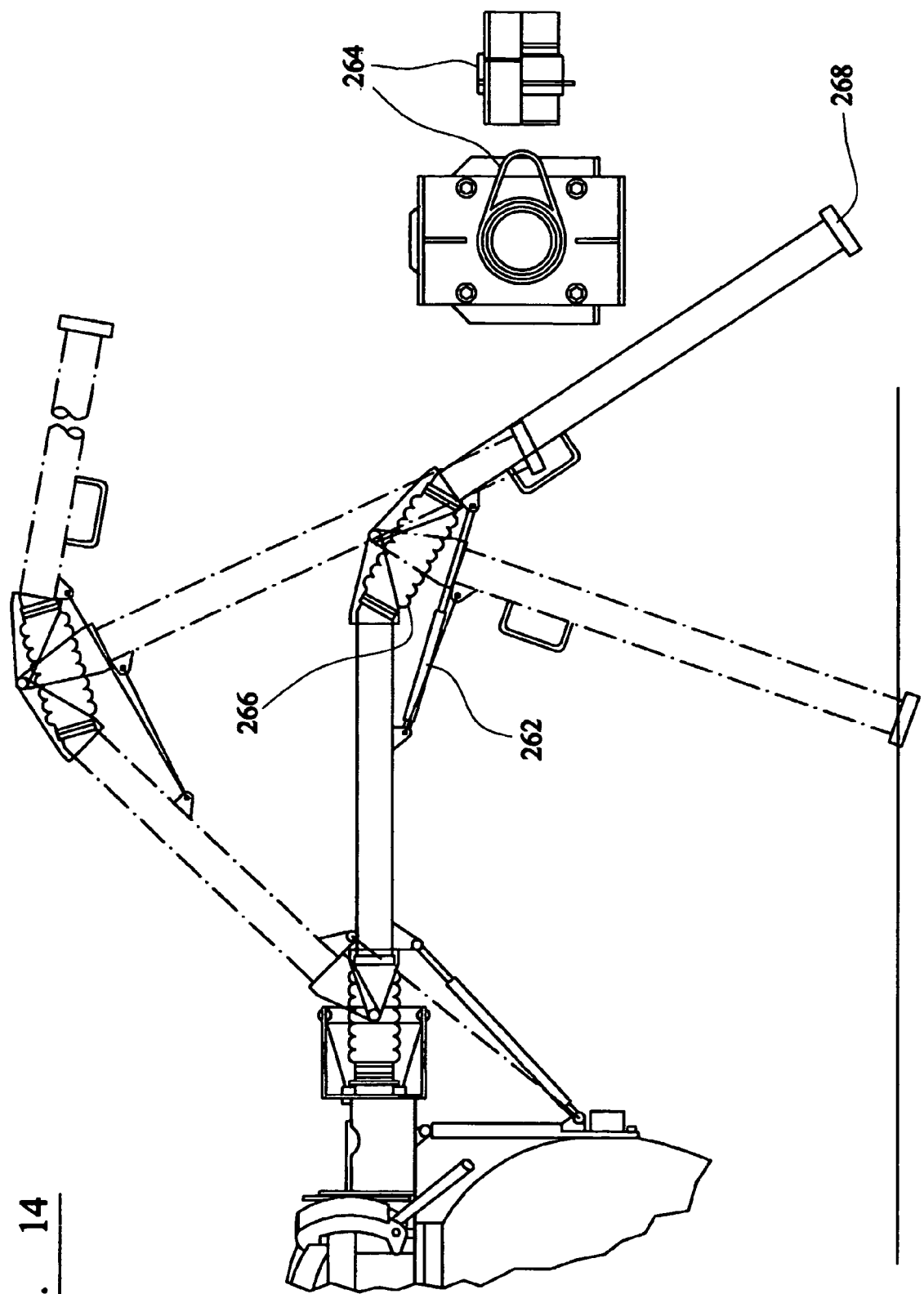
FIG. 14 is a partial plan view of the embodiment of FIG. 13.

FIGS. 13 and 14 illustrated a suction conduit assembly according to a further embodiment of the invention. In this embodiment, the suction conduit 260 is in the form of an articulated arm assembly. Other than set out below, the functioning of the suction conduit is the same as hereinbefore described.

The articulated suction inlet pipe 260 is part balanced by gas springs 262. A spring clip 264 locates in grooves in hose 266 extension tube carrying a seal to prevent loss of vacuum. The suction pipe is articulated at the centre about a horizontal axis, in gimbal arrangement. The mean weight of the pipe and contents is balanced by gas springs. The end of the suction pipe carries a vibrator 268.

It has been found that with this arrangement, the assembly of the suction pipe to the pressure vessel 141 is quicker. The articulation of the suction pipe allows access to a large volume of sand without moving the machine. The vibrator 268 secures continuous collapse of the sand heap, securing a constant feed to the pressure vessel and minimum cycle time.

The invention claimed is:

1. Aggregate mixing apparatus comprising:
   a substantially spherical batch mixing vessel having an inlet to receive constituent solid aggregate material,
   an agitation assembly for mixing the solid aggregate material within the vessel and an outlet to convey batches of mixed material,
   a pressurizing device for pressurizing the mixing vessel to assist in evacuation of the mixed material from the outlet,
   a batch loader including:
   a conduit through which the solid aggregate material are conveyed in use by fluid flow into the batch missing vessel, and
   a jet pump to create a vacuum to load the mixing vessel with the solid aggregate material, without the need for manual loading,
   a single pneumatic source used both to pressurize the mixing vessel and to drive the jet pump.

2. Apparatus according to claim 1 wherein the mixing vessel is provided with a clamping arrangement for preventing accidental lifting of a lid when the vessel is under vacuum.

3. Apparatus according to claim 1 wherein the batch loader comprises an inlet suction conduit assembly which includes an adjustment device, such that the effective length of the conduit assembly can be varied in use.

4. Apparatus according to claim 3 wherein the conduit assembly comprises a section which is capable of telescopic movement.

5. Apparatus according to claim 1 wherein the conduit assembly is provided with an arrangement operable to vibrate the intake.

6. Apparatus according to claim 1 wherein an airflow is provided in the flow discharged from the mixing result.

7. Apparatus according to claim 1 wherein the mixing vessel is provided with a level sensor.

8. Apparatus according to claim 7 wherein the level sensor is an oscillating-vane level sensor.

9. Apparatus according to claim 1 wherein the agitation assembly comprises mixing paddles.

10. Apparatus according to claim 1 wherein the agitation assembly is hydraulically driven.

* * * * *